(12) United States Patent
Schroeder et al.

(10) Patent No.: US 6,729,659 B2
(45) Date of Patent: May 4, 2004

(54) FLARE FITTING ASSEMBLY WITH METAL-TO-METAL LINE SEAL

(75) Inventors: Fred Georg Schroeder, Grosse Ile, MI (US); Zhongping Zeng, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/950,537

(22) Filed: Sep. 11, 2001

(65) Prior Publication Data

US 2003/0047945 A1 Mar. 13, 2003

(51) Int. Cl.⁷ ............................................. F16L 19/02
(52) U.S. Cl. .................. 285/334.5; 285/334.4; 285/353
(58) Field of Search ................ 285/334.1, 334.4, 285/334.5, 353

(56) References Cited

U.S. PATENT DOCUMENTS

| | | | | |
|---|---|---|---|---|
| 187,394 A | * | 2/1877 | Leland | 285/334.1 |
| 582,137 A | * | 5/1897 | Dockery | 285/148.11 |
| 1,013,598 A | | 1/1912 | Gracey | |
| 1,326,970 A | * | 1/1920 | Row et al. | 122/511 |
| 1,794,955 A | * | 3/1931 | Gordon | 285/15 |
| 1,885,042 A | | 10/1932 | Baldwin, Jr. | |
| 1,896,261 A | | 2/1933 | True | |
| 1,977,241 A | | 10/1934 | Parker | |
| 2,090,266 A | * | 8/1937 | Parker | 285/234 |
| 2,230,115 A | * | 1/1941 | Kreidel | 285/248 |
| 2,413,089 A | * | 12/1946 | Vaught | 285/332.1 |
| 2,420,778 A | * | 5/1947 | Herold | 285/113 |
| 2,529,534 A | * | 11/1950 | Beeri | 285/334.2 |
| 3,139,294 A | * | 6/1964 | Richards | 277/622 |
| 3,265,413 A | | 8/1966 | Currie | |
| 3,411,812 A | * | 11/1968 | Prince et al. | 277/622 |
| 4,540,205 A | * | 9/1985 | Watanabe et al. | 285/329 |
| 4,570,981 A | * | 2/1986 | Fournier et al. | 285/332.3 |
| 4,610,466 A | * | 9/1986 | Geer et al. | 285/12 |
| 5,332,267 A | | 7/1994 | Harrison | |
| 5,332,271 A | | 7/1994 | Grant et al. | |
| 5,503,438 A | * | 4/1996 | Swauger | 277/622 |
| 5,997,050 A | | 12/1999 | Fleckenstein et al. | |
| 6,279,965 B1 | * | 8/2001 | Kida | 285/268 |

FOREIGN PATENT DOCUMENTS

| | | | | |
|---|---|---|---|---|
| FR | 2269020 | * | 11/1975 | 285/334.5 |
| GB | 18483 | | 6/1903 | |
| GB | 2018926 | * | 10/1979 | 285/334.5 |

* cited by examiner

*Primary Examiner*—Eric K. Nicholson
(74) *Attorney, Agent, or Firm*—Brinks Hofer Gilson & Lione

(57) ABSTRACT

A flare fitting assembly includes a first coupling member and a second coupling member adapted to be cooperatively coupled together. The first coupling member has a first through bore with one end adapted to accept and retain a first tube. The second coupling member has a second through bore adapted to be disposed upon a second tube with an outwardly flared end. An arcuately shaped seating surface is disposed within the first through bore of the first coupling member. A conically flared seating surface is disposed within the second through bore of the second coupling member adapted to engage an outer surface of the flared end of the second tube such that a line seal is formed between the inner surface of the flared end of the second tube and the arcuate surface when the first and second coupling members are cooperatively coupled.

16 Claims, 3 Drawing Sheets

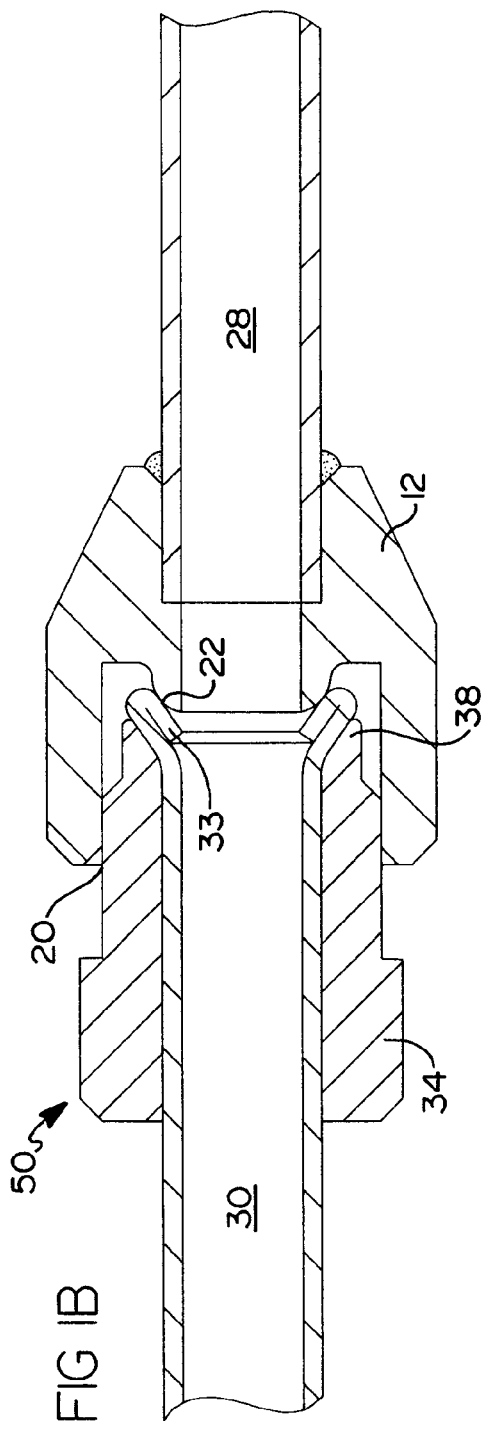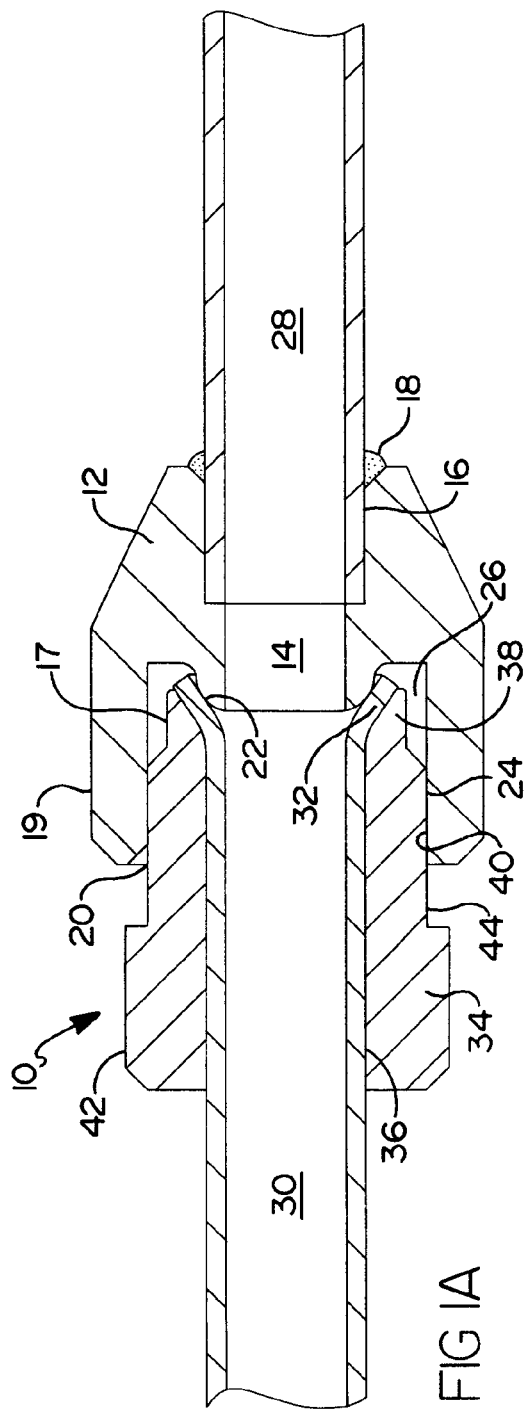

FLARE FITTING ASSEMBLY WITH METAL-TO-METAL LINE SEAL

BACKGROUND OF THE INVENTION

1. Field of the Invention

The present invention relates generally to flare fittings and, more specifically, to a flare fitting assembly that interconnects two metal tubes and creates a metal-to-metal line seal used for the transport of pressurized liquids or gasses.

2. Description of the Related Art

It is known to provide a coupling or fitting, for joining a flared tube end to another tube for the transport of pressurized liquids or gasses such as in an air conditioning system of a motor vehicle. Typically, a flare fitting utilizes two coupling members. One of the tube ends to be joined is inserted through a first coupling member and is mechanically flared. The two coupling members of the fitting are engaged together and tightened thereby internally clamping the flared tube end to a conically shaped flare seat, or mating surface within the second coupling member. The practice includes forming the flare with essentially the same angular deflection as the conical seat of the opposing coupling member. In order to have a leak-proof seal within the joint, the inner surface of the flared tube must engage the conical seat of the opposing coupling member along a continuous conical circumferential area. The integrity of the seal generally relies upon the malleability of the flared tube, the seat, or both. One or both of these surfaces are caused to slightly yield, or deform in the coupling process by the application of a reasonably high torquing force being applied to the coupling members. This insures a good seal in the event the flare is misshaped or the seat has some imperfections. In this manner, a relatively wide sealing surface area is produced for systems employing soft metal tubing materials.

Although the fitting works well with soft tube materials, the wide sealing area can withstand only relatively low system stress translating to lower pressure applications. When system applications require either harder materials to be employed, such as stainless steel, or higher system operating pressures to be reached, the standard flare fitting with a flare to conical surface seal cannot provide the necessary sealing contact. First, the harder materials do not yield or deform to the extent necessary to obtain a good wide contact seal. Even if an initial wide area contact seal is achieved by use of the standard flare fitting, high pressures will cause leakage. Secondly, if soft metal tube materials are used for high-pressure applications, additional torque must be applied to the fitting in an attempt to avoid leaks. This additional torque applied to the coupling members can cause negative results. This manifests itself in the shearing off of the flared end, or shearing of the hex surfaces of the couplings, or exceeding the torque limitations of the coupling members thereby stripping their threads.

Therefore, it is desirable to provide a new flare fitting with a seal that can withstand high operating pressures and work with harder materials. It is also desirable to provide a flare fitting that does not shear off the flared tube end if the torque applied to the fitting is excessive.

SUMMARY OF THE INVENTION

Accordingly, the present invention is a flare fitting assembly with a metal-to-metal line seal. The flare fitting assembly mates a flared tube end to an arcuate surface within the opposing coupling member to create a line seal. The line seal provides high stress sealing along a line contact at the flare seat that is not found in the typical flare fitting.

One advantage of the present invention is that the fitting is capable of supporting a tubing with an extremely high burst pressure while maintaining a very low leakage or seepage rate. Another advantage of the present invention is that the flare fitting may be utilized with either a single or double flared tube end. Yet another advantage of the present invention is that the flare fitting may be used with a metal sealing washer to extend the sealing capability of the fitting and prevent galling of the mating surfaces.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1A is a fragmentary elevational view of a flare fitting assembly, according to the present invention, depicting a single flare coupling.

FIG. 1B is a fragmentary elevational view of a flare fitting assembly, according to the present invention, depicting a double flare coupling.

DESCRIPTION OF THE PREFERRED EMBODIMENT(S)

Figure 2B:
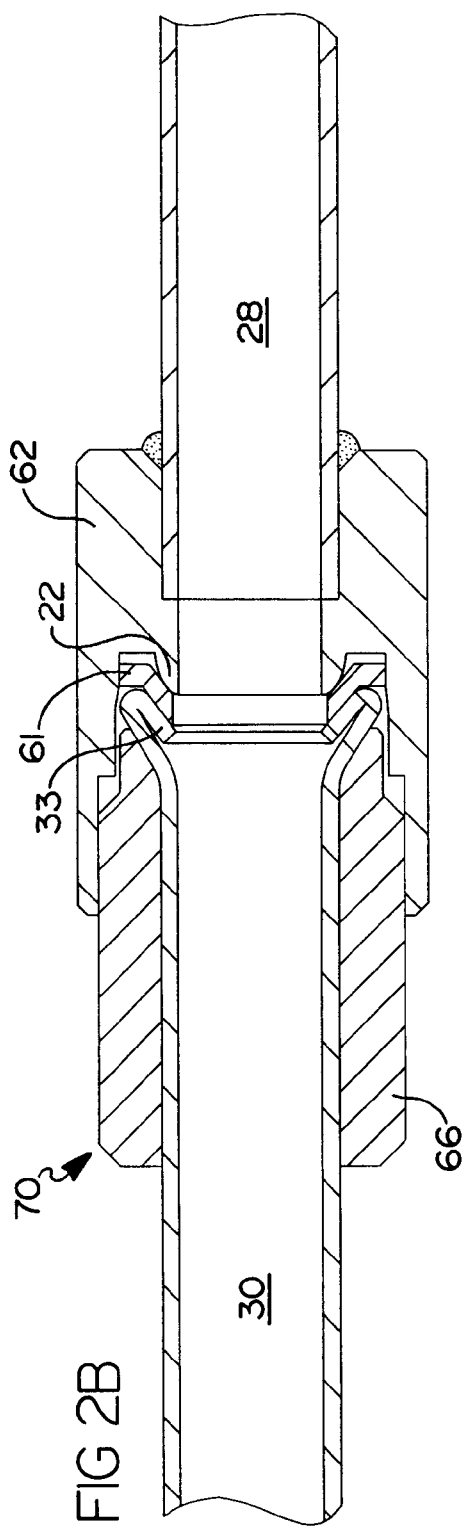
FIG. 2B is a fragmentary elevational view of a flare fitting assembly, according to the present invention, depicting a double flare coupling utilizing a sealing washer.

Referring to the drawings and in particular to FIG. 1A, one embodiment of a flare fitting assembly 10, according to the present invention, for coupling of a first metal tube 28 to a second metal tube 30 is shown. The flare fitting assembly 10, in this non-limiting embodiment, may be used in an air conditioning system (not shown) of a motor vehicle (not shown). The flare fitting assembly 10 serves as a tube coupling for the transfer of liquids and/or gasses as required by the system in which it operates and is capable of supporting high-pressure applications.

The flare fitting assembly 10 comprises two coupling members 12 and 34. The first coupling member 12 is generally cylindrical in shape and has a smooth through-bore 14 extending axially with a tube bore 16 at one end and a main bore 20 at the other end. The tube bore 16 is machined such that it can accept the outer diameter of metal tube 28 in a close-tolerance fit. The end of tube 28 is disposed within the tube bore 16 of the first coupling member 12 and is joined, sealed, and retained therein by a common method such as brazing, shown at 18. The main bore 20 of the first coupling member 12 has an arcuate mating surface or seat 22 formed at its base. A portion of the outer diameter of the first coupling member 12 is formed circumferentially in a hex shape generally at 19 for engaging the first coupling member 12 with a wrench (not shown) during assembly of the flare fitting assembly 10. The first coupling member 12 also has threads 24 disposed about the inner surface of the main bore 20 for engagement to opposing threads disposed on the second coupling member 34. In this manner, based on the internal placement of threads 24, the first coupling member 12 is what is commonly referred to as the female coupling of the flare fitting assembly 10.

The second coupling member 34 is also generally cylindrical in shape and has a smooth through-bore 36 extended axially with an outwardly shaped conical flare 38 at one end. The through-bore 36 is machined such that it can accept the outer diameter of metal tube 30 in a close-tolerance fit. The tube 30 is inserted through the through-bore 36 of the second coupling member 34 and is flared by a common mechanical flaring method at its end as shown at 32. While maintaining the close-tolerance fit, the second coupling member 34 is free to rotate and move slideably about tube 30. It should be appreciated that the flares disposed on the conically shaped end 38 of the second coupling member 34 and the flare end 32 of tube 30 are produced in accordance with conventional standards as known in the art and may conform to one of the two generally accepted angles of either 37 or 45 degrees.

The flared tube end 32 is formed at approximately the same angle as the conically flared end 38 of the second coupling member 34, such that the outwardly flared end 38 of the second coupling member 34 and the outer, or back side of the flared tube end 32 are congruent. Outer diameter 44 of the second coupling member 34 is formed to fit within the main bore 20 of the first coupling member 12 and has opposing threads 40 to engage the threads 24 of the first coupling member 12. In this manner, based on the external placement of threads 40, the second coupling member 34 is what is commonly referred to as the male coupling of the flare fitting assembly 10. Outer portion 42 of the second coupling member 34 is circumferentially formed in a hex shape for engaging the second coupling member 34 with a wrench (not shown) during assembly of the flare fitting assembly 10.

As the two coupling members 12 and 34 are threadably engaged, the outwardly flared end 38 of the second coupling member 34 rests on the back side of the flared tube end 32 and draws the flared end 32 inward to contact the arcuate mating surface 22 of the first coupling member 12. As the flared end 32 of tube 30 sealingly engages the arcuate mating surface 22, a circular line seal is formed. The metal tube 30 is of a hard material (i.e., stainless steel) and has minimal deformation as it is pressed onto the arcuate mating surface 22. In this manner, as torque is applied to the coupling members 12 and 34, the line seal which is formed in a circular course radially about the arcuate surface is maintained and the tube material at 32 does not distort to the point of completely conforming itself to the shape of the arcuate mating surface 22. The line seal formed between the arcuate surface 22 and the flared tube end 32 is capable of sustaining high system stress and maintaining high system pressures.

Finally, the engagement end of the second coupling member 34 has a shoulder recess 17 machined into it so as to form a pocket or cavity 26 at the base of the main bore 20 of the first coupling member 12 when the coupling members 12 and 34 are assembled. This prevents the engagement end of the second coupling member 34 from bottoming in the main bore 20 of the first coupling member 12 and reducing or removing the sealing pressure that is applied to the line seal, which would disrupt or degrade the seal.

In a second non-limiting embodiment, as shown as flare fitting assembly 50 in FIG. 1B, tube 30 has a double folded flare 33, formed in a conventional manner, on its end. The double folded flare 33 may be used for different tubing materials and may add additional strength to the engagement between the flared end 38 of the second coupling member 34 and the flared tube end 33. Even though the hard tubing materials used in flare fitting assembly 50 allows for only a minimal distortion of the double flare 33 as it forms a line seal with the arcuate mating surface 22, additional tubing material is placed in the sealing area by the nature of the double flare itself. This additional tubing material fits into cavity 26, which prevents a wedging, or cramping of material at the base of the main bore 20 that would interfere with the seal. It should be appreciated that the tubes 28 and 30 may be made of various suitable wall thickness and diameters. It should be further appreciated that the construction of the coupling members shown in FIGS. 1A and 1B is not limited to producing the first coupling member 12 as a female coupling and the second coupling member 34 as a male coupling.

In another non-limiting embodiment, the first coupling member 12 may be produced with external male threads while retaining the arcuate mating surface 22 and a brazed connection to the metal tube 28. This embodiment of a male first coupling member 12 would cooperatively engage a female second coupling member 34, which would be produced with internal female threads. The female second coupling member 34 would retain the outwardly flaring surface 38 and be free to rotate and slideably move about the flared metal tube 30.

Figure 2A:
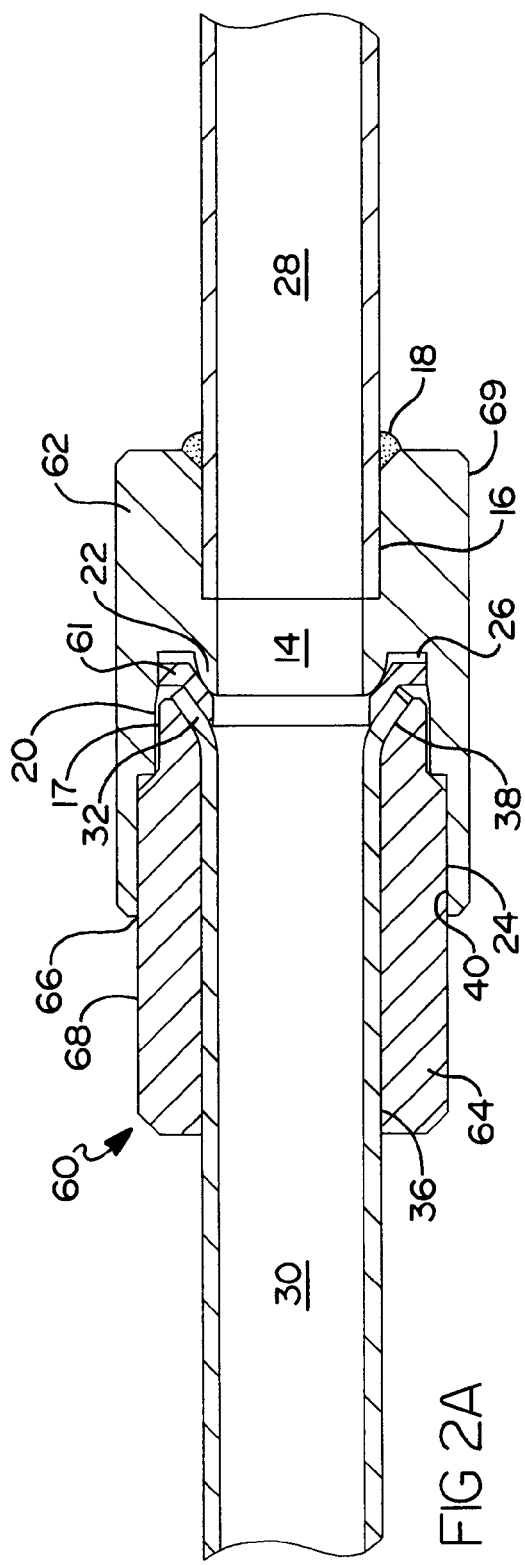
FIG. 2A is a fragmentary elevational view of a flare fitting assembly, according to the present invention, depicting a single flare coupling utilizing a sealing washer.
Figure 3:
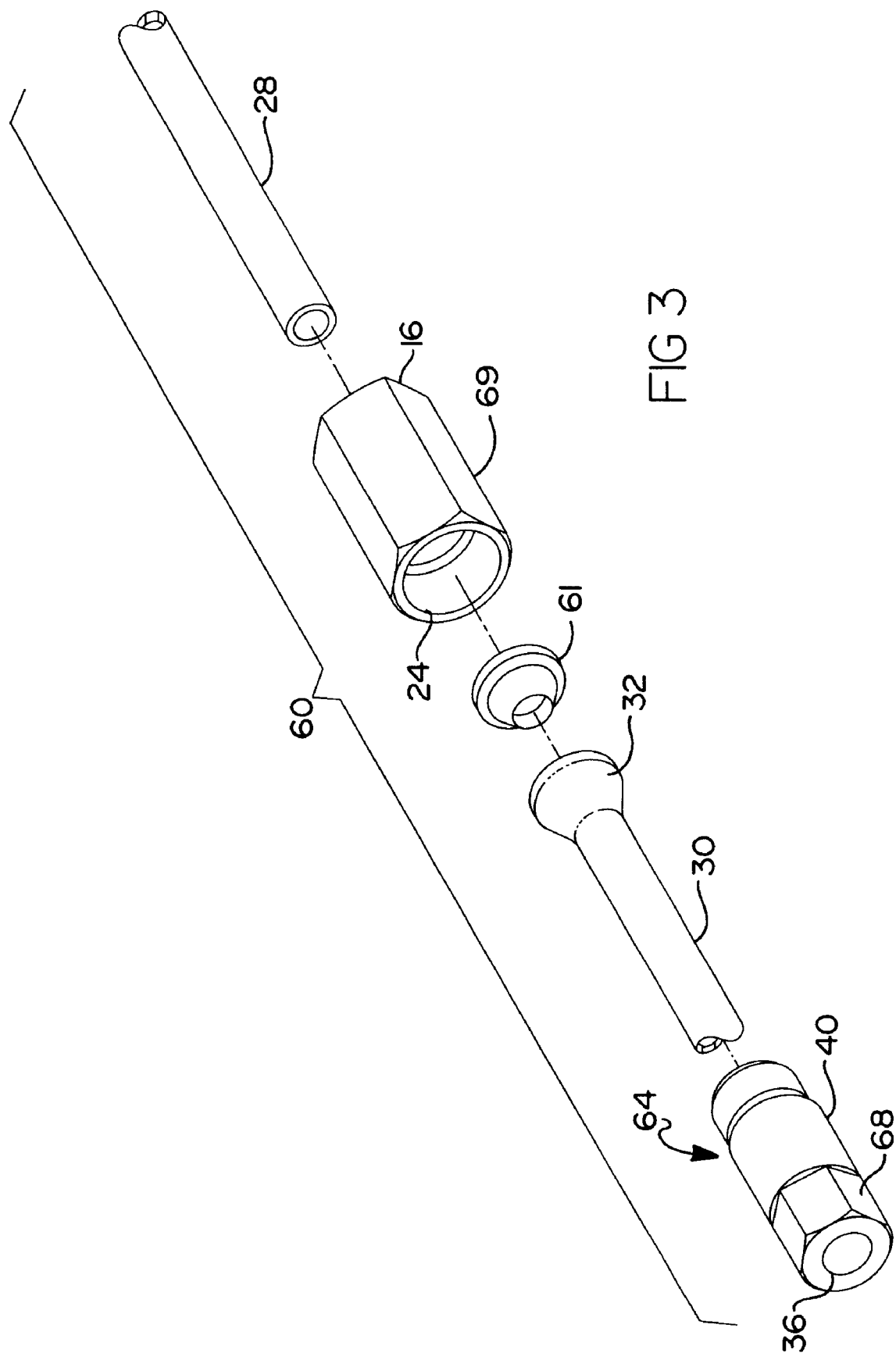
FIG. 3 is an exploded oblique view of a flare fitting assembly, according to the present invention, utilizing a sealing washer.

Referring to FIGS. 2A, 2B and 3, another non-limiting embodiment is shown. This embodiment has the addition of a sealing washer 61. The sealing washer 61 is placed between the arcuate mating surface 22 and the inner surface of the flared end 32 of tube 30. In one non-limiting embodiment, the sealing washer 61 may be permanently press-fit into the female coupling member and be non-serviceable. The sealing washer 61 aids in the proper alignment of the flared tube end 32 within the flare fitting assembly 60, 70 and allows increased sealing torque to be applied.

As shown in FIG. 2A, the flare fitting 60 comprises two coupling members 62 and 64. Coupling members 62 and 64 are substantially similar to the above-described 12 and 34. The first coupling member 62 is generally cylindrical in shape and has a smooth through-bore 14 extending axially with a tube bore 16, a main bore 20, and an additional thread bore 66. The tube bore 16 is machined such that it can accept the outer diameter of metal tube 28 in a close-tolerance fit. The end of tube 28 is disposed within the tube bore 16 of the first coupling member 62 and is joined, sealed, and retained therein by a common method such as brazing, shown at 18. The main bore 20 of the first coupling member 62 has an arcuate mating surface, or seat 22 formed at its base. The thread bore 66 has internal female threads 40 disposed within for engagement to opposing external male threads disposed on the second coupling member 64. The outer diameter 69 of the first coupling member 62 is formed circumferentially in a hex shape for engaging the first coupling member 62 with a wrench (not shown) during assembly of the flare fitting assembly 60.

The second coupling member 64 is also generally cylindrical in shape and has a smooth through-bore 36 extending axially with an outwardly shaped conical flare 38 at one end. The through-bore 36 is machined such that it can accept the outer diameter of metal tube 30 in a close-tolerance fit. The tube 30 is inserted through the through-bore 36 of the second coupling member 64 and is flared by a common mechanical flaring method at its end as shown at 32. While maintaining the close-tolerance fit, the second coupling member 64 is free to rotate and move slideably about tube 30. It should be appreciated that the flare disposed on the conically shaped end 38 of the second coupling member 64 and the flare end 32 of tube 30 are produced in accordance with conventional standards as known in the art and may conform to one of the two generally accepted angles of either 37 or 45 degrees.

The flared tube end 32 is formed at approximately the same angle as the conically flared end 38 of the second coupling member 64, such that the outwardly flared end surface 38 of the second coupling member 64 and the outer, or back side of the flared tube end 32 are congruent. As shown in FIG. 3, the outer diameter 68 of the second coupling member 64 is formed to fit within the thread bore 64 of the first coupling member 62 and has opposing male threads 40 about the inner half to engage the female threads 24 of the first coupling member 62. The outer half of the outer diameter 68 of the second coupling member 64 is circumferentially formed in a hex shape for the purpose of engaging the second coupling member 64 with a wrench (not shown) during assembly of the flare fitting 60.

As the two coupling members 62 and 64 are threadably engaged, the outwardly flared end surface 38 of the second coupling member 64 rests on the back side of the flared tube end 32 and draws the flared end 32 inward to contact with the flared sealing washer 61. The sealing washer 61 rests against the arcuate mating surface 22 of the first coupling member 62. As the flared end 32 of tube 30 sealingly engages the sealing washer 61, the sealing washer 61 is forcibly pressed against the arcuate mating surface 22 forming a circular line seal. The sealing washer 61 is of a slightly softer material than the tube and coupling materials and deforms slightly as it is pressed between the flared tube end 32 and the arcuate mating surface 22. In this manner, as torque is applied to the coupling members 62 and 64, the line seal which is formed in a circular radial course about the arcuate surface is maintained and the sealing washer 61 slightly conforms to the arcuate surface 22. However, the sealing washer 61 does not distort to the point of completely conforming itself to the shape of the arcuate mating surface 22. The line seal formed between 22 and sealing washer 61 is capable of sustaining high system stress and maintaining high system pressures. The sealing washer 61 may or may not be treated with a dry sealing and anti-galling compound as necessary for the specific application.

Finally, the engagement end of the second coupling member 64 has a shoulder recess 17 machined into it. The recess 17 is of a diameter to fit, without interference, within the main bore 20 of the first coupling member 62. This forms a pocket or cavity 26 at the base of the main bore 20 of the first coupling member 62 when the coupling members are assembled. This prevents the engagement end of the second coupling member 64 from crushing, pinching, or shearing off the sealing washer 61 against, or into, the bottom of the main bore 20, which would reducing or remove the sealing pressure applied to the line seal, thereby disrupting the seal.

In another non-limiting embodiment, as shown as flare fitting assembly 70 in FIG. 2B, tube 30 has a double folded flare 33, formed in a conventional manner, on its end. The double folded flare 33 may be used for different tubing materials and may add additional strength to the engagement between the flared end 38 of the second coupling member 34 and the flared tube end 33. It should be appreciated that the tubes 28 and 30 may be made of various suitable wall thickness and diameters. It should be further appreciated that the construction of the coupling members shown in FIGS. 2A, 2B and 3 is not limited to producing the first coupling member 62 as a female coupling and the second coupling member 64 as a male coupling. In another non-limiting embodiment, the first coupling member 62 may be produced with external male threads while retaining the arcuate mating surface 22 with a brazed connection to the metal tube 28. This embodiment of a male first coupling member 62 would cooperatively engage a female second coupling member 64, which would be produced with internal female threads. The female second coupling member 64 would retain the outwardly flaring surface 38 and be free to rotate and slideably move about the flared metal tube 30.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A flare fitting assembly comprising:
   a first coupling member and a second coupling member adapted to be cooperatively coupled together, said first coupling member being one-piece and having a first through bore with one end adapted to be disposed about one end of a first tube and an arcuately shaped seating surface at another end of said first through bore, said second coupling member having a second through bore adapted to be disposed about a second tube having an outwardly flared end;
   said second coupling member having a conically flared seating surface at one end of said second through bore adapted to engage an outer surface of the flared end of the second tube such that said conically flared seating surface of said second coupling member presses the flared end of the second tube against said arcuately shaped seating surface of said first coupling member to form a line seal between an inner surface of the flared end of the second tube and said arcuately shaped seating surface of said first coupling member when said first coupling member and said second coupling member are cooperatively coupled; and
   wherein said first coupling member has internal female threads to engage said second coupling member and a hexagonal outer circumference.

2. A flare fitting assembly comprising:
   a first coupling member and a second coupling member adapted to be cooperatively coupled together, said first coupling member being one-piece and having a first through bore with one end adapted to be disposed about one end of a first tube and an arcuately shaped seating surface at another end of said first through bore, said second coupling member having a second through bore adapted to be disposed about a second tube having an outwardly flared end;
   said second coupling member having a conically flared seating surface at one end of said second through bore adapted to engage an outer surface of the flared end of the second tube such that said conically flared seating surface of said second coupling member presses the flared end of the second tube against said arcuately shaped seating surface of said first coupling member to form a line seal between an inner surface of the flared end of the second tube and said arcuately shaped seating surface of said first coupling member when said first coupling member and said second coupling member are cooperatively coupled; and
   wherein said second coupling member has external male threads about a first portion of its circumference to engage the said first coupling member and a hexagonal shape about a second portion of its circumference.

3. A flare fitting assembly comprising:

a first coupling member and a second coupling member adapted to be cooperatively coupled together, said first coupling member being one-piece and having a first through bore with one end adapted to be disposed about one end of a first tube and an arcuately shaped seating surface at another end of said first through bore, said second coupling member having a second through bore adapted to be disposed about a second tube having an outwardly flared end;

said second coupling member having a conically flared seating surface at one end of said second through bore adapted to engage an outer surface of the flared end of the second tube such that said conically flared seating surface of said second coupling member presses the flared end of the second tube against said arcuately shaped seating surface of said first coupling member to form a line seal between an inner surface of the flared end of the second tube and said arcuately shaped seating surface of said first coupling member when said first coupling member and said second coupling member are cooperatively coupled; and wherein said second coupling member has internal female threads to engage the said first coupling member and a hexagonal outer circumference.

4. A flare fitting assembly comprising:

a first coupling member and a second coupling member adapted to be cooperatively coupled together, said first coupling member having a first through bore with one end adapted to accept and retain a first tube, said second coupling member having a second through bore adapted to be disposed about a second tube having an outwardly flared end;

said first coupling member having an arcuately shaped seating surface at one end of said first through bore;

said second coupling member having a conically flared seating surface at one end of said second through bore adapted to engage an outer surface of the flared end of the second tube such that said conically flared seating surface of said second coupling member presses the flared end of the second tube against said arcuately shaped seating surface of said first coupling member to form a line seal between an inner surface of the flared end of the second tube and said arcuately shaped seating surface of said first coupling member when said first coupling member and said second coupling member are cooperatively coupled; and wherein a conical sealing washer is disposed within said first coupling member over said arcuately shaped seating surface such that the line seal is formed between said arcuately shaped seating surface and said sealing washer when said flare fitting assembly is assembled.

5. A flare fitting assembly as set forth in claim 6 wherein said first coupling member has an internal cavity about the arcuate seat adapted to accept an edge of said sealing washer such that said sealing washer will not be damaged and said line seal disrupted in an over-torquing condition of the said flare fitting assembly.

6. A flare fitting assembly comprising:

a first coupling member and a second coupling member adapted to be cooperatively coupled together, said first coupling member having a first through bore and an arcuately shaped seating surface, said first through bore having one end adapted to be disposed about one end of a first tube, said second coupling member having a second through bore adapted to be disposed about a second tube having an outwardly flared end, said second coupling member having a conically flared seating surface at one end of said second through bore adapted to engage an outer surface of the flared end of the second tube; and a conical sealing washer disposed within said first coupling member over said arcuately shaped seating surface such that the coupling of the said first coupling member and said second coupling member forms a line seal between said arcuately shaped seating surface and said sealing washer when said conically flared seating surface of said second coupling member presses the flared end of the second tube against said sealing washer.

7. A flare fitting assembly as set forth in claim 6 including brazing to attach the first tube to said first coupling member.

8. A flare fitting assembly comprising:

a first coupling member and a second coupling member adapted to be cooperatively coupled together, said first coupling member having a first through bore and an arcuately shaped seating surface, said first through bore having one end adapted to accept and retain a first tube, said second coupling member having a second through bore adapted to be disposed about a second tube having an outwardly flared end;

a conical sealing washer disposed within said first coupling member over said arcuately shaped seating surface such that the coupling of the said first coupling member and said second coupling member forms a line seal between said arcuately shaped seating surface and said sealing washer; and wherein said second coupling member is slideably and rotatably disposed about the second tube and has an outward conically flared seating surface disposed within said second through bore adapted to engage the outward flares of the second tube thereby retaining said second coupling member on the second tube.

9. A flare fitting assembly as set forth in claim 8 including a set of opposing screw threads to operatively couple said first and said second coupling members together.

10. A flare fitting assembly as set forth in claim 9 wherein said first coupling member has internal female threads to engage said second coupling member and a hexagonal outer circumference.

11. A flare fitting assembly as set forth in claim 10 wherein said second coupling member has external male threads about a first portion of its circumference to engage the said first coupling member and a hexagonal shape about a second portion of its circumference.

12. A flare fitting assembly as set forth in claim 9 wherein said first coupling member has external male threads about a first portion of its circumference to engage the said second coupling member and a hexagonal shape about a second portion of its circumference.

13. A flare fitting assembly as set forth in claim 12 wherein said second coupling member has internal female threads to engage said first coupling member and a hexagonal outer circumference.

14. A flare fitting assembly comprising:

a first coupling member and a second coupling member adapted to be cooperatively coupled together, said first coupling member having a first through bore and an arcuately shaped seating surface, said first through bore having one end adapted to accept and retain a first tube, said second coupling member having a second through bore adapted to be disposed about a second tube having an outwardly flared end;

a conical sealing washer disposed within said first coupling member over said arcuately shaped seating surface such that the coupling of the said first coupling member and said second coupling member forms a line seal between said arcuately shaped seating surface and said sealing washer; and wherein said sealing washer is permanently press fit into said first coupling member.

15. A flare fitting assembly as set forth in claim 8 wherein said first coupling member has an internal cavity about the arcuate seat adapted to accept an edge of said sealing washer.

16. A flare fitting assembly comprising:

a first coupling member and a second coupling member adapted to be cooperatively coupled together, said first coupling member having a first through bore with one end adapted to accept and retain a first tube, said second coupling member having a second through bore adapted to be disposed about a second tube having an outwardly flared end;

said first coupling member having an arcuately shaped seating surface at one end of said first through bore;

said second coupling member having a conically flared seating surface at one end of said second through bore adapted to engage an outer surface of the flared end of the second tube;

a conically flared sealing washer disposed within said first coupling member over said arcuately shaped seating surface, said washer having an inner conically flared surface adapted to engage said arcuately shaped seating surface and an outer conically flared surface adapted to engage an inner surface of the flared end of the second tube that is retained in said second coupling member such that a line seal is formed between said sealing washer and said arcuately shaped seating surface and a surface seal is formed between said sealing washer and the flared end of the second tube when said flare fitting assembly is assembled; and said first coupling member having a cavity about said arcuately shaped seating surface adapted to accept an edge of said sealing washer such that said sealing washer will not be damaged and said line seal disrupted in an over-torquing condition between said first coupling member and said second coupling member.

* * * * *